United States Patent [19]
Badesha et al.

[11] Patent Number: 5,686,189
[45] Date of Patent: Nov. 11, 1997

[54] FUSING COMPONENTS CONTAINING CERAMER COMPOSITIONS

[75] Inventors: Santokh S. Badesha; Robert J. Gruber, both of Pittsford, N.Y.

[73] Assignee: Xerox Corporation, Stamford, Conn.

[21] Appl. No.: 44,870

[22] Filed: Apr. 8, 1993

[51] Int. Cl.$^6$ ...................................................... B32B 9/00
[52] U.S. Cl. .......................... 428/446; 428/447; 428/448; 428/450; 428/457; 428/421; 428/339; 428/35.8; 428/36.9; 492/53; 399/320
[58] Field of Search ...................................... 428/323, 327, 428/331, 421, 446, 447, 448, 906, 35.8, 36.9, 450, 457, 339; 430/98, 99; 355/279, 290, 295, 285; 525/903; 492/18, 53, 56, 59; 399/320, 328, 333, 338, 339

[56] References Cited

U.S. PATENT DOCUMENTS

| | | | |
|---|---|---|---|
| 3,663,842 | 5/1972 | Miller | 310/8.3 |
| 3,775,163 | 11/1973 | Marzocchi | 117/126 GB |
| 4,051,100 | 9/1977 | Bjerk et al. | 260/42.18 |
| 4,400,434 | 8/1983 | Santaso et al. | 428/421 |
| 4,500,688 | 2/1985 | Arkles | 525/431 |
| 4,711,818 | 12/1987 | Henry | 428/421 |
| 4,764,560 | 8/1988 | Mitchell | 524/506 |
| 4,810,564 | 3/1989 | Takahashi et al. | 428/213 |
| 4,849,469 | 7/1989 | Crosby et al. | 524/439 |
| 4,917,980 | 4/1990 | Badesha et al. | 430/58 |
| 5,013,624 | 5/1991 | Yu | 430/60 |
| 5,017,432 | 5/1991 | Eddy et al. | 428/422 |
| 5,116,703 | 5/1992 | Badesha et al. | 430/59 |
| 5,141,788 | 8/1992 | Badesha et al. | 428/36.8 |
| 5,166,031 | 11/1992 | Badesha et al. | 430/124 |
| 5,177,552 | 1/1993 | Isogai et al. | 355/285 |
| 5,200,284 | 4/1993 | Chen et al. | 430/33 |
| 5,206,084 | 4/1993 | Takeda et al. | 428/336 |

OTHER PUBLICATIONS

Encyclopedia of Polymer Science and Engineering, vol. 8, 1987, pp. 279–284, 294–295, 329–337, "Interpenetrating Polymer Networks".

"Fuser Roll Coatings", Henry; Xerox–Disclosure Journal, vol. 4, No. 6; Nov./Dec. 1979; p. 821.

"Filler Treatments for Thermally Conductive Silicone Elastomers"; Lentz et al.; Xerox Disclosure Journal; vol. 5; No. 5; Sep./Oct. 1980; pp. 493–494.

"Ceramers; Hybrid Materials Incorporating Polymeric/Oligomeric Species Into Inorganic Glasses utilizing A Sol–Bel Approach"; Wilkes et al; ACS Polymeric Reprints; vol. 26; No. 2; 1985: pp. 300–301.

*Primary Examiner*—Marie R. Yamnitzky
*Attorney, Agent, or Firm*—Zosan S. Soong

[57] ABSTRACT

A fuser member is disclosed with a supporting substrate having an outer layer of a composition comprising integral interpenetrating networks of haloelastomer and silica.

14 Claims, 1 Drawing Sheet

FUSING COMPONENTS CONTAINING CERAMER COMPOSITIONS

CROSS REFERENCE TO RELATED COPENDING APPLICATION

Attention is directed to the following related application filed concurrently: Santokh S. Badesha et al., "Fusing Components Containing Grafted Ceramer Compositions" (Attorney Docket No. D/92067Q), Ser. No. 08/044,860 the disclosure of which is totally incorporated by reference.

BACKGROUND OF THE INVENTION

This invention relates generally to a fuser member, a method for fabricating the fuser member, and a method of fusing toner images in electrostatographic reproducing apparatus. In particular, the present invention relates to a fuser member which may preferably take the form of a fuser roll, pressure roll or release agent donor roll containing an overcoating of a ceramer composition.

Conventionally, the term ceramer generically refers to a hybrid material of organic and inorganic composition which typically has ceramic like properties. As used herein, the term ceramer refers to, in embodiments of the present invention, a material comprised of substantially uniform integral interpenetrating networks of haloelastomer and silica, wherein both the structure and the composition of the haloelastomer and silica networks are substantially uniform when viewed through different slices of the fuser member.

The phrase interpenetrating network refers to the intertwining of the haloelastomer and silica polymer strands for the ceramer.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to achieve the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip, effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems take the form of a heated cylindrical fuser roll having a fusing surface which is backed by a cylindrical pressure roll forming a fusing nip there between. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in a electrostatographic printing system.

One fusing system involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and are fairly collectively illustrated in, for example, U.S. Pat. No. 4,777,087 to Heeks et al. While highly successful in providing a fusing surface with a very low surface energy to provide excellent release properties to ensure that the toner is completely released from the fuser roll during the fusing operation, these systems suffer from a significant deterioration in physical properties over time in a number of fusing environments. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

A more recent development in fusing systems involves the use of fluoroelastomers as fuser members which have a surface with a metal containing filler. The polymeric release agents having functional groups interact with the metal containing filler in the fluoroelastomer surface. Such fusing systems, fusing members and release agents, are described in U.S. Pat. No. 4,264,181 to Lentz et al., U.S. Pat. No. 4,257,699 to Lentz and U.S. Pat. No. 4,272,179 to Seanor, the disclosures of which are totally incorporated by reference. Typically, the fluoroelastomers are (1) copolymers of vinylidenefluoride and hexafluoropropylene, and (2) terpolymers of vinylidene fluoride, hexafluoropropylene and tetrafluoroethylene. Commercially available materials include: Viton E430, Viton GF and other Viton designations as Trademarks of E.I. Dupont deNemours, Inc. as well as the Fluorel materials of 3M Company. The preferred curing system for these materials is a nucleophilic system with a bisphenol crosslinking agent to generate a covalently crosslinked network polymer formed by the application of heat following basic dehydrofluorination of the copolymer. Exemplary of such a fuser member is an aluminum base member with a poly(vinylidenefluoridehexafluoropropylene) copolymer cured with a bisphenol curing agent having copper oxide or lead oxide filler dispersed therein and utilizing a mercapto functional polyorganosiloxane oil as a release agent. The use of polymeric release agents having functional groups which interact with a fuser member to form a thermally stable, renewable self-cleaning layer having release properties for electroscopic thermoplastic resin toners is described in U.S. Pat. Nos. 4,029,827 to Imperial et al., 4,101,686 to Strella et al. and 4,185,140 also to Strella et al., the disclosures of which are totally incorporated by reference.

However, a significant problem of the fluoroelastomer/metal oxide material such as Viton/copper oxide is its relative instability against certain charge control additives which reduces the life of the fusing components, especially for fusing of colored toner. Thus, there is a need for a fusing component material which exhibits one or more of the following characteristics: superior toughness, excellent wear resistance, excellent release capability, and degradation resistance against charge control additives.

Various compositions for components of fuser members are known as illustrated by: Badesha et al., U.S. Pat. No. 5,141,788; Eddy et al., U.S. Pat. No. 5,017,432; and Henry, "Fuser Roll Coatings," Xerox Disclosure Journal, Vol. 4, No. 6, p. 821 (November/December 1979).

Compositions containing organic and inorganic components and processes for the preparation thereof include: Badesha et al., U.S. Pat. No. 5,116,703; Yu, U.S. Pat. No. 5,013,624; Badesha et al., U.S. Pat. No. 4,917,980; Santoso et al., U.S. Pat. No. 4,400,434; Bjerk et al., U.S. Pat. No. 4,051,100; Marzocchi, U.S. Pat. No. 3,775,163; Miller, U.S. Pat. No. 3,663,842, Lentz et al., "Filler Treatments For Thermally Conductive Silicone Elastomers," Xerox Disclosure Journal, Vol. 5, No. 5, pp. 493–94 (September/October 1980); and Wilkes et al., "Ceramers: Hybrid Materials Incorporating Polymeric/Oligomeric Species Into Inorganic Glasses Utilizing A Sol-Gel Approach", ACS Polymer Reprints, Vol. 26 (2), pp. 300–301 (1985).

Badesha et al., U.S. Pat. No. 5,166,031 discloses a fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

SUMMARY OF THE INVENTION

It is an object to provide a fuser member having an overcoating which exhibits one or more of the following characteristics: superior toughness, excellent wear resistance, excellent release capability, and degradation resistance against toner additives, for example, charge control agents.

It is another object to provide fuser, pressure, and donor rolls having a ceramer overcoating.

It is still another object to provide new materials comprised of substantially uniform integral interpenetrating networks of fluoroelastomer and silica.

Additional objects are to provide processes for the preparation of fuser members containing an overcoating of a ceramer.

These objects and others are accomplished by providing a fuser member comprising a supporting substrate and a layer comprised of integral interpenetrating networks of haloelastomer and silica, wherein the layer is preferably positioned as the outer layer of the fuser member.

BRIEF DESCRIPTION OF THE DRAWINGS

Other aspects of the present invention will become apparent as the following description proceeds and upon reference to FIG. 1 which is a sectional view of a fuser system which may use the fuser member of the present invention.

DETAILED DESCRIPTION

Figure 1:
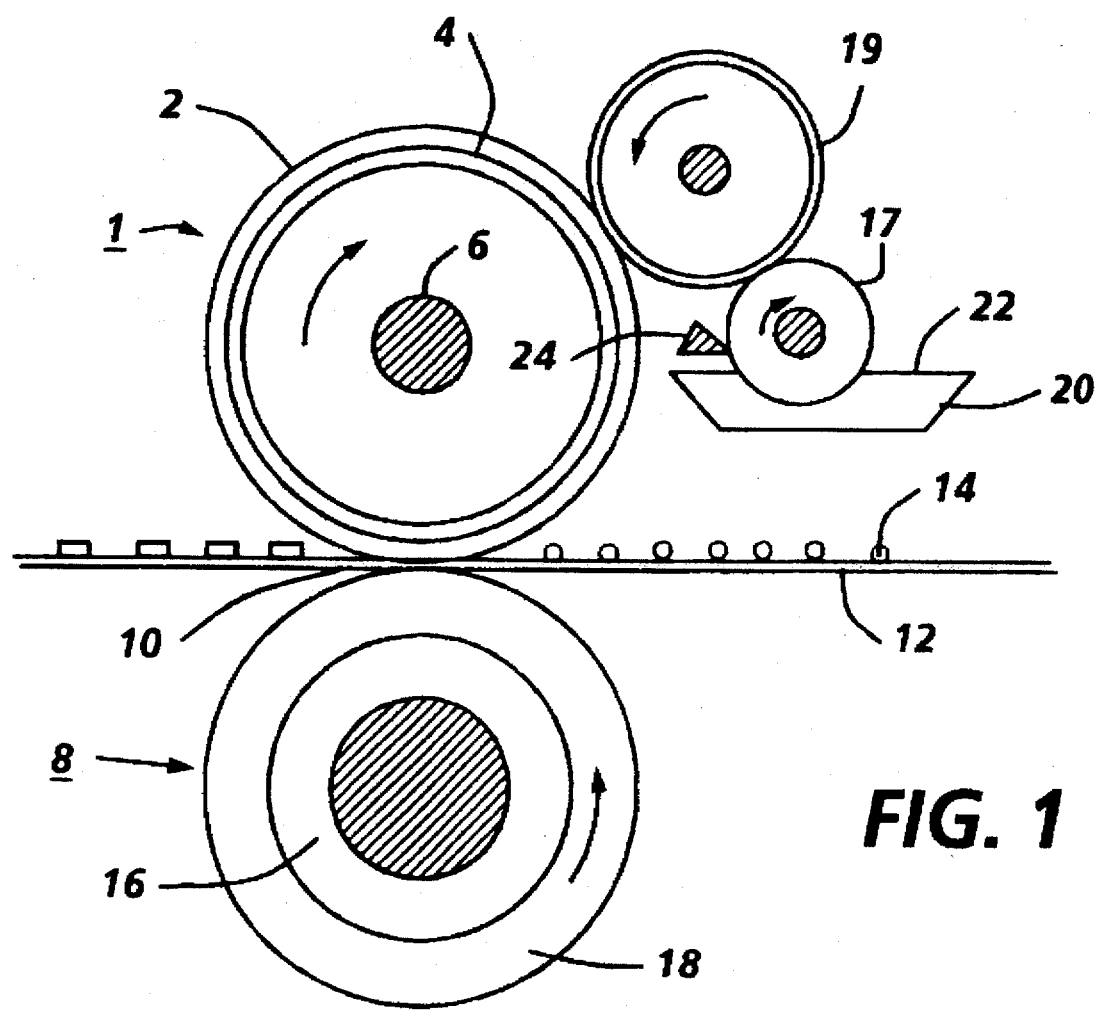

A typical fuser member of the present invention is described in conjunction with a fuser assembly as shown in FIG. 1 where the numeral 1 designates a fuser roll comprising elastomer layer 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to the surface of elastomer layer 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to elastomer layer 2 in controlled thickness ranging from submicrometer thickness to thickness of several microns of release fluid. Thus, by metering device 24, about 0.1 to 2 microns or greater thicknesses of release fluid can be applied to the surface of elastomer layer 2. In FIG. 1, a layer of the ceramer (not shown), having a thickness ranging for example from about 10 to about 250 microns, may overcoat layer 18 of pressure roll 8, layer 2 of fuser roll 1, the surface of donor roll 19, or all three rolls. In embodiments, the layer of the ceramer directly overcoats the substrate or core of the roll without one or more intermediate layers. The fuser member may be for example a roll, belt, flat surface or other suitable shape used in the fixing of thermoplastic toner images to a suitable substrate, and it may be in the form of a fuser member, a pressure member or a release agent donor member, and preferably is in the form of a cylindrical roll.

During preparation of the ceramer, the following reactions are believed to occur. An amine coupler having at least one pendant functional group, such as silane, dehydrohalogenates the haloelastomer, resulting in the elimination of a hydrohalogen acid such as hydrofluoric acid and the generation of unsaturated carbon to carbon double bonds on the haloelastomer. The amine coupler adds to one of the carbon atoms of the carbon to carbon double bonds, thereby forming a nitrogen to carbon bond. A hydrolyzable silane compound such as tetraethoxyorthosilicate is added, which undergoes hydrolysis, and the hydrolyzed silane compound reacts with the pendant silane groups of the amine coupler in for example a condensation type reaction. The pendant functional groups of the amine coupler act as initiation sites for the silica network and the silica network grows by the coupling of additional silane compounds to the network via silicon-oxygen bonds by for example condensation type reactions. There is formed a generally homogeneous incorporation of silica network into the haloelastomer network. The various polymeric strands of the ceramer are integral interpenetrating networks. The term integral as applied to the ceramer refers to covalent bonding of the haloelastomer and silica networks via the nitrogen of the amine coupler.

A representative structural formula for the ceramer is as follows:

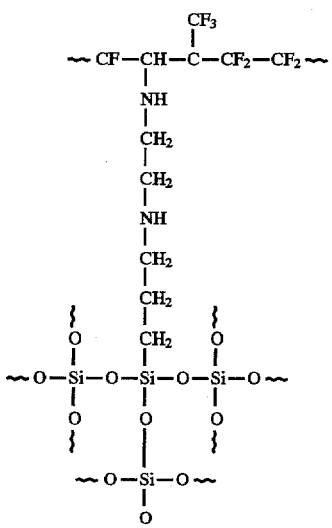

In the above formula, the symbol "~" represents the continuation of the polymeric network.

In embodiments, the ceramer may be prepared by dissolving an effective amount of the haloelastomer, e.g., preferably about 1 to about 35% by weight, more preferably about 5 to about 15% by weight, in an effective amount of a suitable solvent, such as an aliphatic hydrocarbon including for example methyl ethyl ketone, methyl isobutyl ketone and the like at any effective temperature, preferably 25° C. An amine based coupler having one or more pendant functional groups is added in an effective amount, e.g., preferably about 1 to about 15% by weight, more preferably about 3 to about 10% by weight relative to the weight of the haloelastomer, followed by stirring of the solution for about 15 to about 60 minutes at a temperature of about 45° to about 100° C. An effective amount of a silane compound such as tetraethoxyorthosilicate, e.g., preferably about 1 to about 75% weight, more preferably 5 to about 50% by weight relative to the weight of haloelastomer, is then added and heating is continued at a temperature of about 45° to about 100° C. for an additional 20 minutes to about 10 hours. Any effective sequence of addition of the various components may be used to prepare the ceramer. For example, in embodiments, the haloelastomer may be added to a solvent already containing the amine coupler and/or the silane compound. The preferred time of reaction is about 4 hours at about 65° C.

In preferred embodiments, the process to prepare the ceramer may also include other components to facilitate the preparation thereof. For example, a nucleophilic curing agent for the haloelastomer such as Viton Curative No. 50 and diamines such as Diac available from E.I. Dupont deNemours, Inc. may be employed at an effective concentration, preferably about 1 to about 15% by weight, more preferably about 2 to about 10% by weight, relative to the weight of the haloelastomer. Viton Curative No. 50, which incorporates an accelerator (a quaternary phosphonium salt or salts) and a crosslinking agent, such as bisphenol AF in a single curative system, may be added in a 3 to 7 percent solution predissolved to the haloelastomer compound. Also, the basic oxides such as MgO and/or Ca(OH)$_2$ in effective amounts, preferably about 0.5 to about 10% by weight, more preferably about 1 to about 3% by weight, relative to the weight of the haloelastomer, may be added in particulate form to the solution mixture.

The mixture of the ceramer with the curative and the oxides is then ball milled for about 2 to about 24 hours and preferably, about 5 to about 15 hours to obtain a fine dispersion of the oxides. The curative component can also be added after ball milling in a solution form. The solution of the curative is generally prepared by dissolving Viton Curative No. 50 in methyl ethyl ketone ("MEK") or methyl isobutyl ketone ("MIBK"). The concentration of the solids, i.e., the ceramer with the curative and the oxides, can vary from about 5% to 25% by weight, and preferably from about 10–15% by weight.

Providing an effective layer of the ceramer on the fuser member substrate may be accomplished by any suitable known method such as by spraying, dipping, flow, web or the like a solution of the homogeneous suspension of the ceramer to a level of film of preferably about 10 to about 125 microns in thickness, and more preferably about 15 to about 75 microns in thickness. The thickness of the ceramer overcoating is selected to provide a layer thin enough to prevent a large thermal barrier for fusing and thick enough to allow a reasonable wear life. While molding, extruding and wrapping techniques are alternative means which may be used, it is preferred to spray successive applications of the solvent solution. When the desired thickness of coating is obtained, the coating is cured, by any suitable known method, and thereby bonded to the roll surface. A typical step curing process is heating for about 2 hours at about 93° C. followed by about 2 hours at about 149° C. followed by about 2 hours at about 177° C. followed by about 16 hours at about 208° C. In an alternative procedure, the solvent may be removed by evaporation by known means, the ceramer rinsed with a hydrocarbon solvent such as hexane to remove unwanted reactants, if any, and the ceramer redissolved in the original solvent followed by the addition of Viton Curative No. 50 and the subsequent formation of the outer layer.

A fuser member can be fabricated by depositing a thin layer of the ceramer on a substrate. A fuser member also can be fabricated by coating a thin layer of the ceramer on a substrate having an elastomeric coating. In embodiments, a fuser member can be fabricated with an optional adhesive layer between the ceramer and the substrate. Where there is an optional elastomer coating on the substrate, the adhesive layer is intermediate between the ceramer and the elastomer coating of the substrate. Any suitable adhesive may be employed in an effective amount where the adhesive layer preferably is from about 0.1 mil to about 3 mils thick, and more preferably from about 1 mil to about 2 mils thick. Examples of adhesives include: Thixon 403/404 available from Morton International of Ohio; a silane type compound such as Union Carbide A-1100; epoxy resins available for example from Dow Chemical Company such as Dow Tactix 740, Dow Tactix 741, and Dow Tactix 742, and the like, optionally with a crosslinker or curative such as Dow H41 available from the Dow Chemical Company. Any suitable material may be employed for the elastomeric coating including the haloelastomers described herein, especially the fluoroelastomers; silicones; a terpolymer elastomer made from ethylene-propylene diene toohomer ("EPDM"); and the like.

The haloelastomer may be any suitable halogen containing elastomer such as a chloroelastomer, a bromoelastomer, or the like, mixtures thereof, and preferably is a fluoroelastomer. The haloelastomer may be present in any effective amount in the ceramer, and preferably is present in an amount of about 99 to 25% by weight, and more preferably about 95 to 50% by weight. Fluoroelastomer examples include those described in detail in U.S. Pat. No. 4,257,699 to Lentz, as well as those described in Eddy et al., U.S. Pat. No. 5,017,432 and Ferguson et al., U.S. Pat. No. 5,061,965, the disclosures of which are totally incorporated by reference. As described therein these fluoroelastomers, particularly from the class of copolymers and terpolymers of vinylidenefluoride hexafluoropropylene and tetrafluoroethylene, are known commercially under various designations as Viton A, Viton E, Viton E60C, Viton E430, Viton 910, Viton GH and Viton GF. The Viton designation is a Trademark of E.I. Dupont deNemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Arias a poly (propylene-tetrafluoroethylene), Fluorel TT (LII900) a poly (propylene-tetrafluoroethylene-vinylidenefluoride) both also available from 3M Company as well as the Tecnoflons identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent and in U.S. Pat. No. 5,017,432. In a particularly preferred embodiment, the fluoroelastomer is one having a relatively low quantity of vinylidenefluoride, such as in Viton GF, available from E.I. Dupont deNemours, Inc. The Viton GF has 35 mole percent vinylidenefluoride, 34 percent hexafluoropropylene and 29 mole percent tetrafluoroethylene with 2 percent cure site monomer. It is generally cured with a conventional aliphatic peroxide curing agent.

The curing agent for the haloelastomer crosslinks the haloelastomer chains by creating for example carbon-oxygen-carbon crosslinking where the curing agent is for example a bisphenol type compound such as Viton Curative No. 50. The networks of haloelastomer and silica are formed in the solution and the crosslinking action of the curing agent does not appear to interfere with the formation of the haloelastomer and silica networks.

The amine coupler is selected from the group of strong nucleophilic agents such as peroxides, hydrides, bases, amines, and the like. The preferred agents are selected from the group consisting of primary, secondary and tertiary, aliphatic and aromatic amines, where the aliphatic and aromatic groups have from 2 to 15 carbon atoms. The coupler is selected from the groups which have multifunctionality, one of which is capable of dehydrohalogenation of the haloelastomer thereby creating unsaturation sites followed by an addition reaction. This would result in a product which will have pendant coupler chains. The other functionalities on the coupler are desired to undergo further reactions with the silane compound such as tetraethoxyorthosilicate. The examples of nucleophilic functionality include amines, peroxides, hydrides, and the like. Functionalities which would undergo reactions with the silane compound such as tetraethoxyorthosilicate are siloxy, hydride, halogen, hydroxy, and the like. The amine coupler includes aliphatic and aromatic diamines and triamines having from 2 to 15 carbon atoms where the aromatic groups may be benzene, toluene, naphthalene or anthracene, and the like. It is generally preferred for the aromatic diamines and triamines that the aromatic group be substituted in the ortho, meta and para positions. Typical substituents include lower alkylamino groups such as ethylamino, propylamino and butylamino with propylamino being preferred. Following are examples of commercially available couplers which can be used: N-(2-aminoethyl-3-aminopropyl)-trimethoxysilane available as A0700 from Huls America Inc.; 3-(N-strylmethyl-2-aminoethylamino)propyltrimethoxysilane hydrochloride available as S-1590 from Huls America Inc.; and (aminoethylaminomethyl)phenylethyltrimethoxysilane available as A0698 from Huls America Inc.

The source of the silica network may be any suitable silane type compound such as that having the formula $Si(A)_4$. In this formula, A may be for example OR, where R is an alkyl having 1 to 24 carbon atoms such as methyl, ethyl, propyl, butyl, pentyl, hexyl, heptyl, octyl, and the like; a halogen; hydroxy; or hydride. The silica network may be present in any effective amount, preferably from about 1 to about 50% by weight, and more preferably from about 5 to about 25% by weight, based on the weight of the ceramer.

Adjuvants and fillers may be incorporated in the elastomer in accordance with the present invention providing for example they do not detrimentally affect the ceramers of the present invention. Such fillers normally encountered in the compounding of elastomers include effective amounts of for example of about 1% to about 50% by weight of coloring agents, reinforcing fillers, crosslinking agents, processing aids, accelerators and polymerization initiators, and the like.

The substrate for the fusing member according to the present invention may be of any suitable material and dimensions. For a fuser roll, the substrate may have for example an outside diameter ("OD") of about 3 inches, a length of about 15.5 inches, and a wall thickness of about ¼ inch. For a pressure roll, the substrate may have for example an OD of about 3 inches, a length of about 15.5 inches, and a wall thickness of about ¼ inch For a donor roll, the substrate may have for example an OD of about 1.5 inches, a length of about 15.5 inches, and a wall thickness of about ⅛ inch Typically, it takes the form of a cylindrical tube of aluminum, steel or certain plastic materials chosen to maintain rigidity, structural integrity, as well as being capable of having the ceramer, or intermediate layer such as a silicone elastomer coated thereon and adhered firmly thereto. Typically, the fuser members may be made by injection, compression or transfer molding, or they may be extruded. In a typical procedure the core which may be a steel cylinder is degreased with a solvent and cleaned with an abrasive cleaner prior to being primed with a primer such as Dow Corning 1200. which may be sprayed, brushed or dipped-followed by air drying under ambient conditions for thirty minutes and then baked at 150° C. for 30 minutes. The intermediate layer may be comprised of any suitable material having the proper thermal and mechanical properties such as silicone elastomers, haloelastomers disclosed herein such as fluoroelastomers, ethylene propylene diene monomer, perfluoroalkylether and the like. Preferred intermediate layer materials include Viton GF, Tecnoflons, Fluorel I and II, Arias, silicones, butyl nitrile rubbers. In embodiments, the intermediate layer material exhibits the durameter rating of: about 30 to 100 and preferably about 40 to 70 Shore A. The intermediate layer may be applied according to conventional techniques such as injection molding and casting after which it is cured for up to about 15 minutes and at about 120° to 180° C. to provide a complete cure without a significant post cure operation. This curing operation should be substantially complete to prevent debonding of the one or more intermediate layers from the core when it is removed from the mold. Thereafter the surface of the intermediate layer, preferably silicone elastomer, is sanded to remove the mold release agent and it is wiped clean with a solvent such as isopropyl alcohol to remove all debris.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated. In the following examples, room temperature refers to a temperature at about 25° C.

EXAMPLE 1

The ceramer composition was prepared as follows. A stock solution of Viton GF was prepared by dissolving 250 g of Viton GF in 2.5 liters of methylethyl ketone (M EK) with stirring at room temperature. A four liter plastic bottle and a moving base shaker were used to prepare the stock solution. Approximately one hour to two hours was utilized to accomplish the dissolution. The above solution is then transferred to a four liter Erlenmeyer flask and 25 ml of the amine dehydrofluorinating agent, 3-(N-strylmethyl-2-aminoethylamino) propyltrimethoxysilane hydrochloride (S-1590, available from Huls America Inc.) was added. The contents of the flask were then stirred using a mechanical stirrer while maintaining the temperature between 55° and 60° C. After stirring for 30 minutes, 12.5 grams of tetraethoxyorthosilicate (TEOS), available from Huls America Inc., was added and stirring continued for another five minutes. About 25 grams of acetic acid was then added. The stirring was continued while heating the contents of the flask at around 65° C. for another 4 hours. During this time the color of the solution turned light yellow. The above yellow solution was then cooled to room temperature. To the above solution was then added 5 grams of magnesium oxide, 2.5 grams of calcium hydroxide and 12.5 grams of curative VC-50 available from Dow Chemical Co. The above contents were then ball jarred with ceramic balls as media for 17 hours. The solution was then diluted to about 5 liters with MEK. This dispersion was then spray coated onto a 10 inches×14 inches steel substrate (3 ml thick). The dry film was then removed from the substrate by peeling and then cured by the following heating procedure: 2 hours at 93° C., 2 hours at 149° C., 2 hours at 177° C., and thereafter heating for 16 hours at 208° C. The thickness of the cured film as determined by permoscope was found to be 11 mils. The mechanical properties were determined by Instron Model 1123 (standard test protocol ASTM 412) and the toughness was found to be 5666 lb-in/in$^3$.

EXAMPLE 2

The procedure of Example 1 was repeated with the exception that the amount of tetraethoxyorthosilicate was 25 grams. A dry cured film of 12 mils thickness was obtained as in Example 1 and the toughness of this film was found to be 5905 lb in/in$^3$.

EXAMPLE 3

The procedure of Example 1 was repeated with the exception that the amount of tetraethoxyorthosilicate was 37.5 grams. A dry cured film of 12 mils thickness was obtained as in Example 1 and the toughness of this film was found to be 5452 lb-in/in$^3$.

EXAMPLE 4

The procedure of Example 1 was repeated with the exception that the amount of tetraethoxyorthosilicate was 50 grams. A dry cured film of 13 mils thickness was obtained as in Example 1 and the toughness of this film was found to be 4407 lb-in/in$^3$.

EXAMPLE 5

The procedure of Example 1 was repeated with the exception that the amount of tetraethoxyorthosilicate was 62.5 grams. A dry cured film of 10 mils thickness was obtained as in Example 1 and the toughness of this film was found to be 5306 lb-in/in$^3$.

EXAMPLE 6

The procedure of Example 1 was repeated with the exception that the amount of tetraethoxyorthosilicate was 75 grams. A dry cured film of 9 mils thickness was obtained as in Example 1 and the toughness of this film was found to be 5290 lb-in/in$^3$. A portion of this dispersion (less than 2 liters) was used to make the spray coated film as described in Example 1. Another portion (less than about 1 liter) was used to fabricate a pressure roll as described in Example 8.

EXAMPLE 7

The procedure of Example 1 was repeated with the exception that the amount of tetraethoxyorthosilicate was 100 grams. A dry cured film of 10 mils thickness was obtained as in Example 1 and the toughness of this film was found to be 2528 lb-in/in$^3$.

EXAMPLE 8

An aluminum cylindrical sleeve (3 inches outside diameter×15.5 inches length'¼ inch wall thickness) was abraded with sand paper, followed by degreasing, scrubbing with an abrasive cleaner and thorough washing with water. A primer Dow Corning primer DC1200 was applied to a thickness of 2 to 3 tenths of a mil (5 to 7.5 micrometer), air dried at ambient conditions for 30 minutes and baked at 150° C. for 30 minutes, Subsequently, the primed core was provided with an intermediate layer of a liquid injection molded silicon elastomer by molding Dow Corning LSR590 to the primed core to a thickness of about 0.25 inch. The silicon elastomer was cured for 10–15 minutes at 150° C. but was not post cured. Following removal of the roll from the mold, the mold release material (a silicon type compound) was sanded off and the roll was cleaned with isopropyl alcohol, Then a thin layer roughly 10 mils in thickness, of adhesive A-1100 available from Union Carbide was spray coated onto this roll to improve the adhesion. A portion of the dispersion (less than about 1 liter)from Example 6 was sprayed to a dry thickness of 2 mils onto the above prepared core having the silicone elastomer intermediate layer to form a layer of the ceramer overcoating. The resulting roll was then cured by the following heat profile: 2 hours at 93° C., 2 hours at 149° C., 2 hours at 177° C., and thereafter heating for 16 hours at 208° C. This roll was then cooled to room temperature.

The prepared roll containing the ceramer overcoat was installed in a Xerox Corporation 5090 imaging apparatus as a pressure roll and 500,000 copies were made where the ceramer overcoated pressure roll assisted in fusing the toned images onto the paper. No physical or chemical degradation of the pressure roll surfaces, toner contamination or paper stripping problems were visually observed. The test was suspended without failure after 500,000 copies. The ceramer overcoated roll looked and performed like new even after 500,000 copies. In contrast, the standard pressure roll (sleeved design having a metal core, an intermediate layer of a terpolymer elastomer made from ethylene-propylene diene monomer having a thickness of about ¼ inch, and a top layer of polytetrafluoroethylene having a thickness of about 1/32 inch) when installed in the Xerox Corporation 5090 imaging apparatus showed edge wear at the 11 inch paper path, showed toner contamination and have shown in some instances physical degradation because of the heat and pressure starting at about 300,000 copies.

Toughness of a material is generally directly related to its wear resistance, i.e., as material toughness increases, abradability decreases. The examples evidence the superior toughness and wear resistance of fuser components having a ceramer layer overcoat.

Other modifications of the present invention may occur to those skilled in the art based upon a reading of the present disclosure and these modifications are intended to be included within the scope of the present invention.

We claim:

1. A fuser member comprising a supporting substrate and a layer comprised of integral interpenetrating networks of haloelastomer and silica.

2. The fuser member of claim 1, wherein the interpenetrating networks are substantially uniform.

3. The fuser member of claim 1, wherein the haloelastomer is a fluoroelastomer.

4. The fuser member of claim 3, wherein the fluoroelastomer is selected from the group consisting of poly (vinylidene fluoride-hexafluoro-propylene) and poly (vinylidene fluoride-hexafluoro-propylene-tetrafluoroethylene).

5. The fuser member of claim 1, wherein the layer is from about 10 to about 250 microns thick.

6. The fuser member of claim 1, wherein the supporting substrate is a cylindrical sleeve.

7. The fuser member of claim 1, further comprising one or more intermediate layers between the substrate and the layer.

8. The fuser member of claim 7, wherein the one or more intermediate layers comprise an elastomer layer or an adhesive layer, or both.

9. The fuser member of claim 8, wherein the elastomer layer comprises a haloelastomer or a silicon elastomer.

10. The fuser member of claim 8, wherein the adhesive layer comprises an epoxy resin, optionally in combination with a curative agent.

11. The fuser member of claim 1, wherein the fuser member is a pressure roll, a fuser roll or a release agent donor roll.

12. The fuser member of claim 1, wherein the fuser member is a pressure roll.

13. The fuser member of claim 1, wherein the layer is positioned as the outer layer of the fuser member.

14. The fuser member of claim 1, wherein the layer comprises an amine coupler.

* * * * *